(12) United States Patent
Cho et al.

(10) Patent No.: US 9,349,191 B2
(45) Date of Patent: May 24, 2016

(54) METHOD AND ELECTRONIC DEVICE FOR PROCESSING OBJECT

(71) Applicant: Samsung Electronics Co., Ltd., Suwon-si, Gyeonggi-do (KR)

(72) Inventors: Kyusung Cho, Suwon-si (KR); Ikhwan Cho, Suwon-si (KR); Fedir Zubach, Kyiv (UA); Gennadiy Kis, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 14/182,910

(22) Filed: Feb. 18, 2014

(65) Prior Publication Data

US 2014/0233801 A1 Aug. 21, 2014

Related U.S. Application Data

(60) Provisional application No. 61/765,443, filed on Feb. 15, 2013.

(30) Foreign Application Priority Data

Nov. 27, 2013 (KR) ........................ 10-2013-0145715

(51) Int. Cl.
G06K 9/00 (2006.01)
H04N 5/225 (2006.01)
G06T 7/20 (2006.01)

(52) U.S. Cl.
CPC .. *G06T 7/20* (2013.01); *G06T 7/206* (2013.01)

(58) Field of Classification Search
None
See application file for complete search history.

(56) References Cited

U.S. PATENT DOCUMENTS

| 6,057,892 | A * | 5/2000 | Borer .......................... 348/699 |
| 6,473,462 | B1 * | 10/2002 | Chevance et al. ......... 375/240.16 |
| 2005/0094849 | A1 * | 5/2005 | Sung et al. .................... 382/103 |
| 2012/0099651 | A1 * | 4/2012 | Robertson et al. ....... 375/240.16 |

* cited by examiner

*Primary Examiner* — Randolph I Chu
(74) *Attorney, Agent, or Firm* — Jefferson IP Law, LLP

(57) ABSTRACT

A method of operating an electronic device is provided. The method includes tracking at least one object included in a plurality of digital images including at least a first image and a second image. The tracking of the object includes determining values of phase correlation between a part of the first image and a part of the second image, determining a position of a peak value among the values of the phase correlation, and determining a variance of the values of the phase correlation according to at least a part of the peak vale.

22 Claims, 11 Drawing Sheets

METHOD AND ELECTRONIC DEVICE FOR PROCESSING OBJECT

CROSS-REFERENCE TO RELATED APPLICATION(S)

This application claims the benefit under 35 U.S.C. §119(e) of a U.S. Provisional application filed on Feb. 15, 2013 in the U.S. Patent and Trademark Office and assigned Ser. No. 61/765,443 and under 35 U.S.C. §119(a) of a Korean patent application filed on Nov. 27, 2013 in the Korean Intellectual Property Office and assigned Serial number 10-2013-0145715, the entire disclosures of each of which are hereby incorporated by reference.

TECHNICAL FIELD

The present disclosure relates to a method of processing an object on an image in an electronic device.

BACKGROUND

Recently, portable terminals have been developed to perform various user functions based on the development of hardware technology. For example, a picture or video camera function has become one of important functions in the terminal. Accordingly, with relation to the picture or camera function, research for practical use and extensibility of the various user functions has actively progressed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, and an aspect of the present disclosure is to provide an improved method of processing an object.

In accordance with an aspect of the present disclosure, a method of operating an electronic device is provided. The method includes tracking at least one object included in a plurality of digital images including at least a first image and a second image. The tracking of the object includes determining values of phase correlation between a part of the first image and a part of the second image, determining a position of a peak value among the values of the phase correlation, and determining a variance of the values of the phase correlation according to at least a part of the peak value.

In accordance with still another aspect of the present disclosure, an electronic device is provided. The electronic device includes a memory configured to store a plurality of digital images, and a processor configured to process the images. The processor is configured to track at least one object included in the plurality of digital images including a first image and a second image, to determine values of phase correlation between a part of the first image and a part of the second image, to determine a position of a peak value among the values of the phase correlation, and to determine a variance of the values of the phase correlation according to at least a part of the peak value.

As described above, according to the present disclosure, the present disclosure can support the improved method of processing the object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some structural elements may be exaggeratingly or schematically shown, or omitted, and each structural element may not be wholly shown in an actual size. Therefore, the present disclosure is not limited by a relative size or distance suggested in the accompanying drawings.

Figure 1:
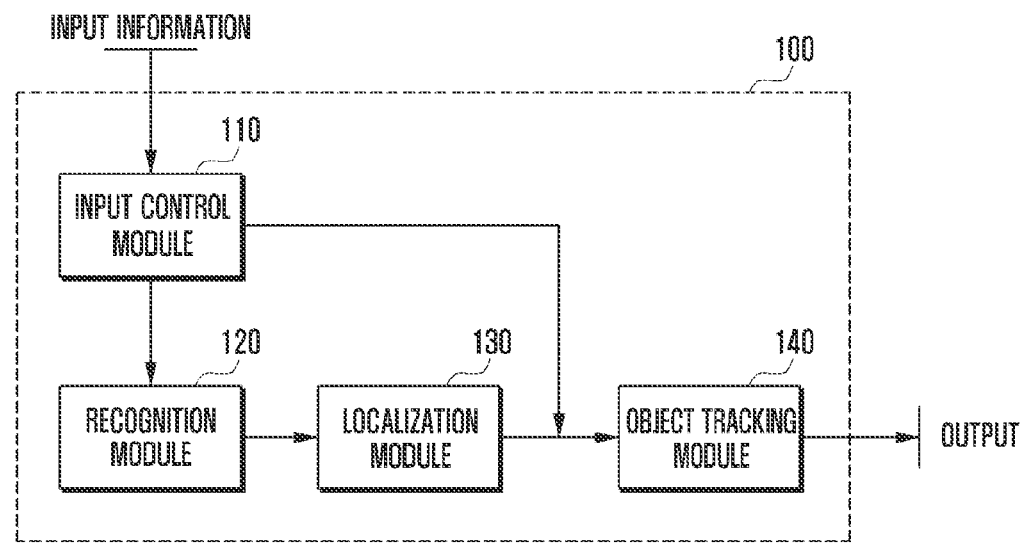
FIG. 1 is a block diagram schematically illustrating an object processing device which supports an object tracking function according to an embodiment of the present disclosure.

FIG. 1 is a block diagram schematically illustrating an object processing device which supports an object tracking function according to an embodiment of the present disclosure. The object processing device of the present disclosure described below can recognize a certain object among elements included in a captured image. Further, the object processing device of the present disclosure can smoothly track the recognized object. Such an object processing device may be applicable to various image processing technologies. In the following description, the object processing device which supports an Augmented Reality (AR) function will be described. Therefore, the object processing device may be at least a part of an AR processing unit.

The AR processing unit can use memory, a Central Processing Unit (CPU) and Graphic Processing Unit (GPU) for the necessary processing with input data. The AR processing unit can also use a reference database (DB) for identifying and recognizing targets. The output of the AR processing unit can include, for example, identification information and localization information. Localization information can be used to determine the 2 dimensional (2D)/3 dimensional (3D) angle or orientation of the target object. The identification information can be utilized to determine what the object is. An AR content management unit can be used to organize final video/audio output with the output of AR processing unit and contents from a remote/local contents DB.

An embodiment of the present disclosure evaluates visual scene change and reference objects motion, including cases where objects move relatively to background and to each other. The disclosure provides a computationally efficient method (real-time on mobile devices) of object motion estimation by camera sensor video-in.

Referring to FIG. 1, the object processing device 100 of the present disclosure may include an input control module 110, a recognition module 120, a localization module 130, and an object tracking module 140.

The above-mentioned object processing device 100 can perform image processing for image information among obtained input information. In this processing, the object processing device 100 may support a tracking function of an object included in an image. Specially, the object processing device 100 may support an intelligent movement application while supporting the object tracking function. The intelligent movement application may include a procedure of determining whether an additional object movement is calculated according to a determined movement reliability of the objects included in the image. The object processing device 100 can more precisely determine a substantial movement of the objects included in the image, based on the determination. Further, the object processing device 100 can perform an application of the AR content according to the movement of the actual objects.

The input control module 110 may classify input information provided to the object processing device 100. Further, the input control module 110 may determine a transfer route of the input information according to a function performing state of the current object processing device 100. For example, the input control module 110 may provide corresponding image information to the recognition module 120 when initial image information is obtained. The image information may be obtained from an image sensor connected to the object processing device 100 or an image sensor disposed in a terminal including the object process device 100.

The input control module 110 may directly transmit the image information to the object tracking module 140 when an image recognition process of the recognition module 120 and an object distinguishing process of the localization module 130 are completed. Alternatively, the input control module 110 may simultaneously transmit the image information to the recognition module 120 and the object tracking module 140. Accordingly, the recognition processing and the object tracking processing for the image information may be performed in parallel.

The input control module 110 may control to refrain from providing the image information to the recognition module 120 while the object tracking function is being performed. Further, the input control module 110 can provide the image information to the recognition module 120 when it fails to track the object. In addition, the input control module 110 may provide different input information, e.g., audio information, sensor information, or the like, to the object tracking module 140 if the AR contents are applied to the objects which are tracked.

The recognition module 120 performs a recognition process of the image information when receiving the image information from the input control module 110. That is, the recognition module 120 may perform a feature detection process, a descriptor calculation process, and an image query process for the received image information.

The feature detection may be a process of collecting features extracted from the image information which passes through a filtering process. At this time, the feature detection may be performed in various aspects by various kinds of the filtered information which is applicable to the object processing device 100. For example, in the feature detection process, the recognition module 120 may perform a discretization process for the image information. Further, the recognition module 120 may apply a predefined specific algorithm to the discrete information so that desired features remain.

A descriptor may be information defining a natural feature of the corresponding image information which is calculated based on the detected features. Such a descriptor may be defined by at least one of a position of the features, an arrangement of the features and the natural characteristic of the features for each predetermined portion in the image information. That is, the descriptor may be a value obtained by simplifying the natural characteristic for a predetermined point of the image information. Therefore, at least one descriptor may be extracted from one piece of the image information.

When a calculation of the descriptor is completed, the recognition module 120 may perform a comparison of the descriptor with reference data through an image query process. That is, the recognition module 120 identifies whether the reference data which has a descriptor identical to the calculated descriptors or descriptors within a desired error range are present. The reference data may be provided by an internal storage unit prepared for an operation of the object processing device 100. Alternatively, the reference data may be provided from an external storage device, e.g., a separate server system, for an operation of the object processing device 100. The reference data may be image information on a specific image which is previously stored or stored just before currently processed image information is obtained. For example, in face recognition, an external reference face database is required to recognize authorized faces, and a difference of different faces may be identified. On the other hand, in general Quick Response (QR) code recognition, a dramatic update of information is not performed. Accordingly, only a specific regulation for the QR code recognition of the database is required, so that the QR code uses the internal reference data. The recognition module 120 simplifies a calculation in the image recognition process by using the reference data. Furthermore, the recognition module 120 may identify a target object by using the reference data.

The localization module 130 may distinguish various objects constituting the image information. Such a localization module 130 may include a feature matching operation and an initial angle estimation (an initial pose estimation) operation. That is, the localization module 130 may extract the features of the objects distinguished from the image information. Further, the localization module 130 may match the features of the specific objects with a desired object of the reference data. At this time, the localization module 130 may newly update the matching information when there is no matching information of the features. When the feature matching for the object is completed, the localization module 130 may perform the initial angle estimation of at least one object included in the image information. The localization module 130 may provide the object information including at least one of the matching information and the initial angle information to the object tracking module 140 in the case that the object processing device 100 activates the object tracking function.

Figure 2:
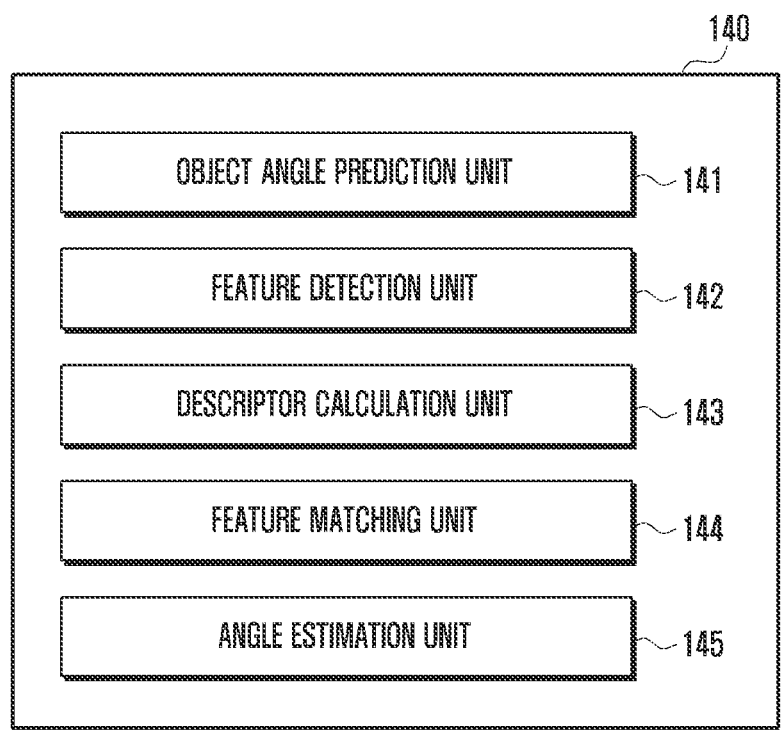
FIG. 2 is a detailed block diagram illustrating a configuration of a tracking module in the structure of FIG. 1 according to an embodiment of the present disclosure.

The object tracking module 140 receives the initial angle estimation of the recognized target objects from the localization module 130. Further, the object tracking module 140 may track the object through a continuous angle calculation of a target object. The object tracking module 140 may have a basic output of the recognition information and the object distinguishing information included in the object angle. Specially, the object tracking module 140 of the present disclosure may apply an adaptive object movement calculation to the image information based on a movement reliability of the objects. Thus, the object tracking module 140 may include the structure as shown in FIG. 2.

The object tracking module 140 described below performs an operation of tracking at least one object included in a plurality of digital images which may include a first image and a second image. In this case, the object tracking module 140 may perform an operation of determining phase correlation values between at least a part of the first image and at least a part of the second image, an operation of determining a position of a peak value among the phase correlation values, and an operation of determining a variance of the phase correlation values by using at least a part of the peak value. Meanwhile, the object tracking module 140 may further perform an operation of tracking at least one object by using at least a part of the variance.

In the case that the variance is less than, or not more than a selected threshold value, the object tracking module 140 performs an operation of tracking at least one object by using a first process, while in the case that the variance is more than, or not less than the selected threshold value, the object tracking module 140 performs an operation of tracking at least one object by using a second process.

The first process performs an operation of determining whether at least one object located at a first position of a first image moves to a second position of a second image, and the second position may be determined by using the position of the peak value.

The first processor may include an operation of determining a pixel correlation between an area of the first position on the first image and an area of the second position on the second image. Here, in the case that the pixel correlation is not less than, or more than a selected value, the first processor may determine that the at least one object moves from the first position to the second position. If it is determined that the at least one object does not move from the first position to the second position, on the other hand, then the first processor may track the at least one object, separately from a position of the peak value.

The operation of tracking the at least one object regardless of the position of the peak value may be an operation of performing the phase correlation calculation for each object on the first and second images.

Meantime, the second processor performs an operation of tracking the at least one object regardless of the position of the peak value. At this time, the phase correlation calculation for each object may be performed for the first and second images. In the operation of performing the phase correlation calculation for each object, the at least one object may be approximated in the selected form.

Hereinafter, an operation of each structural element, which is exemplarily entitled, in each process carried out by the object tracking module 140 described above will be described.

FIG. 2 is a detailed block diagram illustrating a configuration of the object tracking module 140 of FIG. 1 according to an embodiment of the present disclosure.

Referring to FIG. 2, the object tracking module 140 may include an object angle prediction unit 141, a feature detection unit 142, a descriptor calculation unit 143, a feature matching unit 144, and an angle estimation unit 145.

Object angle, or pose, prediction is part of object tracking as one task of AR. It enables continuous tracking and achieving high accuracy. All angle prediction methods that do not use current image information are weak with regard to rapid motion changes, and that often occurs in mobile AR applications. Phase correlation is a well known technique in the related art to estimate a 2D shift between images. Using phase correlation for motion detection is described in US Patent Application Publication 2012/099651, U.S. Pat. Nos. 6,473, 462, and 6,057,892.

The object angle prediction unit 141 may predict an angle of at least one object included in image information. The object angle prediction unit 141 may receive an initial angle estimation value for one or more objects included in the image information from the localization module 130. Therefore, it is possible to predict the angle of the object according to a movement of the objects included in the image information, based on the initial angle estimation value of the objects. That is, the object angle prediction unit 141 may predict which direction, position, and/or angle at least one object included in the image information moves, based on the initial angle estimation value.

More particularly, the object angle prediction unit 141 compares previously obtained image information with currently obtained image information, so as to calculate a movement of the whole image information, i.e., at least one of a movement distance, a movement direction, and a movement angle. Further, the object angle prediction unit 141 may predict a movement of at least one object included in the image information, based on the calculated movement extent. For example, the object angle prediction unit 141 may perform the phase correlation between the previous frame and the current frame. At this time, the object angle prediction unit 141 may perform the phase correlation by applying a Fast Fourier Transform (FFT) algorithm. The object angle prediction may be performed in real time.

On the other hand, the object angle prediction unit 141 of the present disclosure may perform a test for movement reliability of each object included in the previous frame and the current frames. A Boolean value of the result reliability is evaluated, and can be obtained by calculating dispersion of a phase correlation. The dispersion of the phase correlation will be small when a dominant translation is discovered between images. If the dispersion is less than a certain threshold, true is returned, otherwise false is returned. If the shift is reliable then it is implied that device is moved over a static scene. If an object occupies a small area in input images and does not move in the same direction as the background moves, phase correlation will give a 2D shift of the background, not of the object.

No reliability means the scene is highly changed and no substantial correlation between sequential frames is found. If motion estimation (phase correlation) between images failed, motion is estimated for each object separately. This case can be observed in a situation where multiple objects cover most of the image and move in different directions.

If motion estimation between consistent images succeeds, phase correlation results for each tracked object are verified. A tracked object with a known angle on a previous image covers some area. This area itself, a part or any convenient rough approximation of it (such as an inscribed rectangle, or a described rectangle) can be used to verify a 2D shift. Applying this shift to the area (as a 2D object), a corresponding area on the current image is obtained. Then two image areas can be compared using different methods of the related art. Images and their areas can be scaled for better comparison performance. If areas are similar according to the used method of comparison, the 2D shift is considered to be valid for the checked object; if not, motion is estimated for this object separately.

The object angle prediction unit 141 may calculate a variance of the phase correlation of the frames in order to determine the movement reliability. In the case that the variance of the phase correlation is within a predetermined value and the movement reliability of each object is effective, the object angle prediction unit 141 may predict that the objects included in the image information move to a predicted position. Accordingly, the object angle prediction unit 141 may control to apply the movement distance, the direction and the angle prediction through the phase correlation. Here, in the case that movement prediction of the objects is identical to an actual movement of the objects, the object angle prediction unit 141 may determine that the movement of the objects are determined effectively. The object angle prediction unit 141 may receive effectiveness of the movement direction of the objects from the angle estimation unit 145.

If the variance of the phase correlation is within a range of the predetermined value, but the movement reliability of each object is not effective, the object angle prediction unit 141 may control to detect an actual movement direction of the objects. At this time, the object angle prediction unit 141 may designate only the objects which have ineffective movement reliability so as to perform the phase correlation for the objects, or may control to perform the phase correlation for whole objects.

On the other hand, the object angle prediction unit 141 may predict that the movement directions of the objects are not identical, when the variance of the phase correlation is out of the range of the predetermined value. In this case, the object angle prediction unit 141 may perform the phase correlation for each object included in the image information. Further, the object angle prediction unit 141 may predict the movement distance and direction based on a result of the phase correlation.

When the prediction of the object movement is completed by the object angle prediction unit 141, the feature detection unit 142 may detect the feature of the currently obtained image information. The same process as a feature detection performed by the recognition module 120 may be applied to the detection of the feature of the image information feature detection unit 142 performed by the feature detection unit 142. However, the feature detecting process performed by the feature detection unit 142 may be simpler than the feature detecting process performed by the recognition module 120. That is, the feature detection unit 142 may extract a relatively smaller number of features than those in the feature detection performed by the recognition module 120, or may extract the features from a relatively narrower area than that in the feature detection performed by the recognition module 120, in order to support the tracking of the movement of the object.

The descriptor calculation unit 143 may calculate a descriptor based on a result of detecting the feature. The descriptor calculation unit 143 may calculate the descriptor based on the features detected by the feature detection unit 142 of the object tracking module 140. Here, the descriptor may be defined by a predetermined number of the features or the features in a desired area, which are arranged in the image information. The descriptor calculation unit 143 may provide a corresponding result to a feature matching unit 144 when the descriptor calculation is completed.

The feature matching unit 144 may perform the feature matching based on the descriptor calculated by the descriptor calculation unit 143. That is, the feature matching unit 144 may perform the matching of the descriptor including the features at a desired position of the previous frame with the descriptor including the features at a desired position of the current frame.

The angle estimation unit 145 may perform estimation on which angle or position the image information moves at or to through the descriptor matching of the current frame with the previous frame. Based on the estimation, the angle estimation unit 145 may identify whether the movements of the objects included in the image information are identical through the descriptor comparison of the feature matching unit 144. At this time, the angle estimation unit 145 may check whether the movement direction of the objects included in the image information is identical to the predicted information.

Further, the angle estimation unit 145 may determine whether the movement of the objects is effective if the movement directions of the objects are identical. If the movement of the objects is effective, the angle estimation unit 145 may apply a result of the phase correlation to a process of tracking the image information. On the other hand, the angle estimation unit 145 may perform an image information correction if the movement directions of the objects are not identical. The angle estimation unit 145 may designate only the objects which have different movement directions so as to correct the direction and the distance of the corresponding objects. Alternatively, the angle estimation unit 145 may correct the direction and the distance of all objects included in the current image information.

The object tracking function based on the above mentioned movement reliability and the effectiveness of the movement direction of the objects will be described in more detail with reference to FIGS. 3 to 6.

Figure 3:
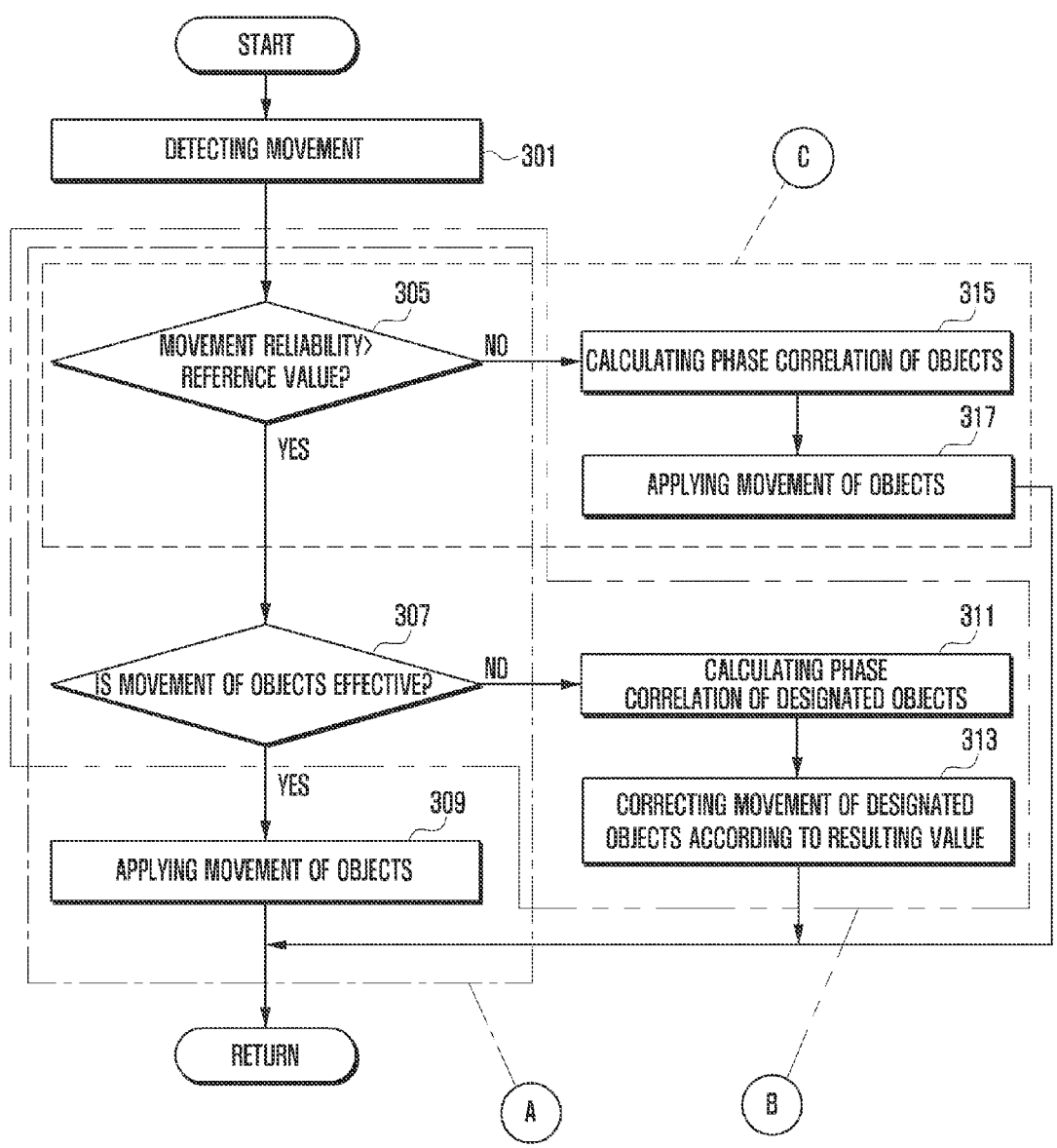
FIG. 3 is a flowchart illustrating a process of tracking an object according to an embodiment of the present disclosure.

FIG. 3 is a flowchart illustrating a process of tracking an object according to an embodiment of the present disclosure.

Figure 4:
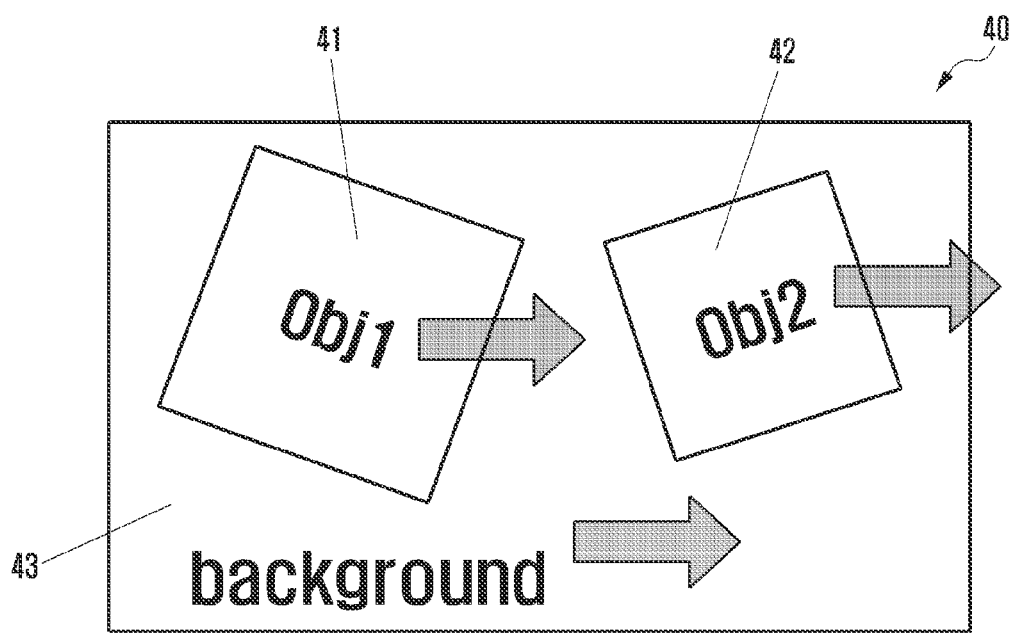
FIG. 4 is a view illustrating object tracking circumstances according to a first embodiment of FIG. 3 according to an embodiment of the present disclosure.

FIG. 4 is a view illustrating the object tracking circumstances according to the first embodiment, e.g., "A" of FIG. 3 according to an embodiment of the present disclosure.

Figure 5:
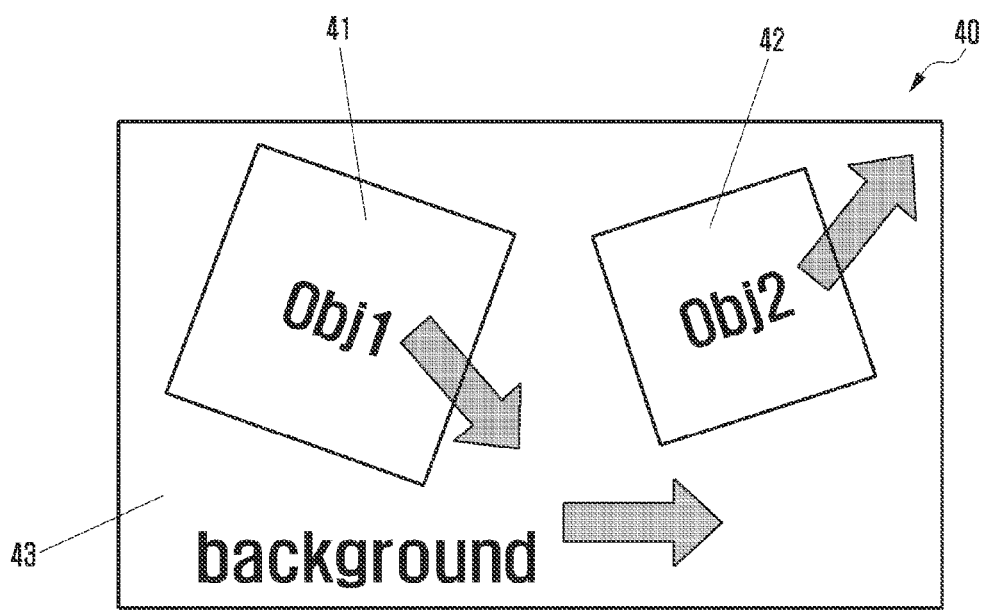
FIG. 5 is a view illustrating object tracking circumstances according to a second embodiment of FIG. 3 according to an embodiment of the present disclosure.

FIG. 5 is a view illustrating the object tracking circumstances according to the second embodiment, e.g., "B" of FIG. 3 according to an embodiment of the present disclosure.

Figure 6:
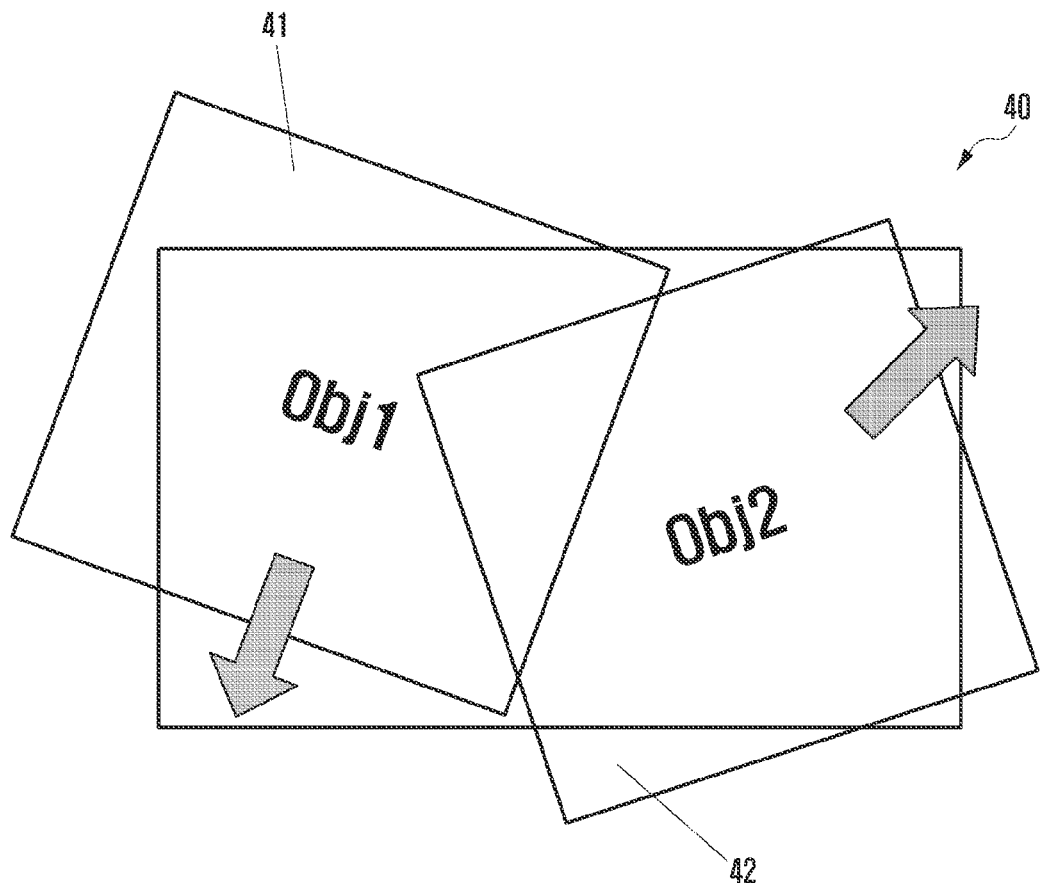
FIG. 6 is a view illustrating object tracking circumstances according to a third embodiment of FIG. 3 according to an embodiment of the present disclosure.

FIG. 6 is a view illustrating the object tracking circumstances according to the third embodiment, e.g., "C" of FIG. 3 according to an embodiment of the present disclosure.

Referring to FIGS. 3 and 4 for the description of one embodiment, e.g., "A", in a method of tracking an object according to the present disclosure, the object tracking module 140 may identify obtained image information and whether the movement of an object is detected, in operation 301. To do this, the object tracking module 140 of the present disclosure may perform the phase correlation between currently obtained image information and previously obtained image information. More particularly, the object tracking module 140 may detect the movement of at least one object previously detected from the current image information. Thus, the object tracking module 140 may perform a comparison of the image information according to the movement of the objects when the movement of the objects is detected.

The object tracking module 140 may compare a movement reliability value calculated as a result of the comparison of the image information according to the movement of the objects with a reference value, in operation 305.

Here, operation 305 of identifying the movement reliability may include a step of identifying whether the movement directions of the whole objects included in the corresponding image information are identical or similar. Thus, the variance of the phase correlation between the current image information and the previous image information may be identified. In the case that the result value in a two-dimensional estimation area according to the phase correlation for the whole image information is a peak value at a predetermined position, the variance may be relatively lower. In the case that the variance is low, it is regarded that the movement reliability is high. If the result value of the phase correlation for the whole image information does not tend to converge in the two-dimensional estimation area, but rather tends to disperse, the variance is determined to be relatively very high. In the case that the variance is high, it is regarded that the movement reliability is low. The above-mentioned variance may be deduced by a numeric value according to the predetermined calculation. As a result, the movement reliability may be indicated by a predetermined numeric value.

On the other hand, although a method of using the phase correlation in order to analyze the movement reliability has been described as an example, the present disclosure is not limited thereto. That is, the above-mentioned movement reliability is a value indicating whether the movement directions of the objects tracked in the image information are identical or similar. Accordingly, if there is a method of calculating the movement direction of the objects in the image information, the method may be used to analyze the movement reliability of the present disclosure. For example, the movement reliability may be determined as to whether the movement directions of the plural objects randomly selected or selected according to a predetermined reference among the plural objects included in the image information are identical.

If the movement reliability is not less than the reference value in operation 305, the object tracking module 140 may identify whether the movement of the objects is effective, in operation 307. In operation 305, the state that the movement reliability is not less than the reference value may indicate a state that the movement directions of the objects in the image information are substantially identical. On the other hand, a process of identifying the effectiveness of the movement of the objects may be a process of identifying whether movement prediction information of the objects is effective. That is, the object tracking module 140 may predict the movement of the objects in the image information as described above, and perform a process of verifying the predicted result. The object tracking module 140 may perform a process of identifying whether a corresponding object is actually present at a predicted movement position of the objects, in operation 307. In the process, the object tracking module 140 may selectively identify effectiveness of the movement of the tracked objects included in the image information.

More particularly, the object tracking module 140 may track one or more objects among the plural objects in the image information. At this time, the object tracking module 140 may track a main object among one or more objects. The main object may be changed according to calculation capability of the object tracking module 140. For example, the main object may be at least one object which has a size larger than a predetermined size among the plurality of objects distinguished in the image information.

The distinction of the object may be performed by various kinds of information in the image information. For example, in the case that one or more boundary areas are included in the image information, and at least one closed surface is formed by one or more boundary areas, the object tracking module 140 may distinguish the closed surface as one object. Further, the object tracking module 140 may recognize a predetermined area distinguished from a surrounding area, which is not a closed surface, as an object. Furthermore, the object tracking module 140 may distinguish a predetermined portion with a shadow area as an object in the image information analyzing process. In addition, the object tracking module 140 may distinguish an area including a larger number of descriptors, which are described above, than a predetermined number or an area analyzed by the descriptor and having a larger size than a predetermined size, as an object.

In the method of tracking the object, which is disclosed in the present disclosure, it is assumed that a process of recognizing and localizing the image information is performed so that the object is distinguished from the image information. Further, the object tracking method of the present disclosure may provide a supporting technology in which the process of tracking the objects is effectively performed in the above assumption circumstances. Accordingly, the object tracking method of the present disclosure is not limited to the process of recognizing and localizing the above-mentioned object. That is, the object tracking method of the present disclosure may be applied to the circumstances in which the object is distinguished, by applying various processes of recognizing and localizing the object.

On the other hand, a case that the movement reliability is not less than a reference value corresponds to a case that whole objects substantially have similar movement paths. More particularly, objects having a relatively wide area among the objects included in the image information may contribute to the movement reliability with a weighted value in comparison with other objects. Accordingly, if the movement reliability is larger than the reference value but the movement of the objects is not effective, there is a high probability that objects having a relatively small area among the objects included in the image information have different movement directions. Thus, when the effectiveness of the movement of the objects is determined in operation 307, the object tracking module 140 may preferably determine the effectiveness of the movement of the objects having the relatively small area among the objects included in the image information. Therefore, the object tracking module 140 may calculate the phase correlation for the objects having the relatively small area and determine the effectiveness of the movement in operation 307. Here, a size of the predefined area may be determined or changed according to an intention of a designer or a result of a test.

If there is no main object in the image information, the object tracking module 140 may calculate the phase correlation for each tracked object and determine the effectiveness of the movement. A case that there is no main object may be a state that plural objects having similar size are arranged in the image information. If the plural objects having the similar size are present, it can be difficult to precisely determine which object moves in a direction different from a direction of remaining objects. If there is no main object or the objects having a similar size are present, therefore, the object tracking module 140 may not perform separate object designation to determine the effectiveness of the movement and calculate the phase correlation for each object so as to determine the effectiveness of the movement. At this time, the object tracking module 140 may perform a sampling for all objects, and determine the effectiveness of the movement of all objects based on the determination of the effectiveness of the movement of the sampled objects.

If the moved objects are present at a predicted position in operation 307, it is determined that the object tracking module 140 has the effectiveness of the movement of the object, and the movement of the objects may be applied in operation 309. That is, the object tracking module 140 determines that the predicted result is precise, thereby tacking the object according to the result. Further, the object tracking module 140 may apply a specific content to the predicted position. For example, the object tracking module 140 may support outputting contents prepared for the application of the augmented reality to the predicted position. The above mentioned operations 305 to 309 correspond to a state that the movements of the objects are identical as shown in FIG. 4.

FIG. 4 illustrates three objects 41, 42, and 43 arranged in the image information area 40. That is, in FIG. 4, the object tracking module 140 may perform a tracking of the plural objects 41, 42, and 43, e.g., a first object (Obj1) 41, a second object (Obj2) 42, and a background object 43, in the image information 40. The first object 41, the second object 42, and the background object 43 may be selected in the process of recognizing and localizing the image information 40. The object tracking module 140 may receive information on the above-mentioned objects 41, 42, and 43 from the localization module 130.

The object tracking module 140 may calculate the variance of the phase correlation between the current image information and the previous image information for the plural objects 41, 42, and 43 if the plural objects 41, 42, and 43 are tracked as shown in FIG. 4. The variance of the phase correlation of the objects which have an identical or similar movement direction may be calculated as a value converging to a predetermined position or a peak value of a predetermined position in two dimensions. Further, in the case that the movement directions of the objects 41, 42, and 43 are different, the variance of the phase correlation may be indicated as a value which does not converge at the predetermined position but is instead dispersed in the two dimensions. Such a feature may be defined as the movement reliability for the movement direction of the objects as described above. Thus, since it is assumed that the movement directions of the objects 41, 42, and 43 are identical in FIG. 4, a relatively high movement reliability value may be detected when the variance of the phase correlation is calculated.

As shown in FIG. 4, when the first object 41, the second object 42, and the background object 43 move in the same direction, the object tracking module 140 may perform a movement tracking in the state that an error is unlikely according to the movement prediction result for the objects. Furthermore, since an error in a movement mapping of an actual object to the predicted position is unlikely when the object has the high movement reliability, an amount of calculation can be reduced in the calculating process. An example of the case that the movement reliability of the object is high may include a movement of an image sensor, or a movement of a device having the image sensor mounted therein. That is, in the case that the image sensor moves by itself without the movement of the individual object on the image corresponding to a subject, this case may correspond to a circumstance in which the movement reliability of the object is high.

On the other hand, the second embodiment of the present disclosure, e.g., B, will be described with reference to FIGS. 3 and 5. In the case that the movement reliability is not less than the reference value in operation 305 of FIG. 3 and the movement reliability of the objects is ineffective in operation 307, the object tracking module 140 performs operation 311 so as to calculate the phase correlation of the designated objects. When the movement reliability is not less than the reference value in operation 305, the movements of the objects included in the image information may be substantially similar. If there is no effectiveness of the object movement in operation 307, at least one of the objects included in the image information may have a movement direction different from that of other objects. If there is no effectiveness of the movement of the object, an object may not be present at the predicted position in the object tracking process.

The object tracking module 140 may identify the movement of all tracked objects in the image information, and predict the movement of each object based on the identification. Then, the object tracking module 140 may identify whether the actual objects are present at the predicted position. To do this, the object tracking module 140 may compare a position feature of a specific object in the previous image information with a feature of a predicted position of the current image information. If the position feature of the specific object of the previous image information is different from the predicted position feature of the current image information, the object tracking module 140 may determine that there is no effectiveness of the object movement. In this process, the object tracking module 140 may identify whether the actual object is present at the predicted position through a process of comparing two or more descriptors as described above. Alternatively, the object tracking module 140 may identify an actual object position by performing a Normalized Cross Correlation (NCC) comparison for the image.

In operation 311, the object tracking module 140 may individually calculate the phase correlation of one or more objects included in the image information. In this process, the object tracking module 140 may calculate the phase correlation for the tracked objects included in the image information.

Alternatively, the object tracking module 140 may designate some objects among all tracked objects included in the image information, and may calculate the phase correlation of the designated objects. For example, the object tracking module 140 may designate objects which have ineffective movement, and may calculate the phase correlation for the designated objects.

On the other hand, the object tracking module 140 may calculate individual phase correlation only for objects having a relatively small area among the tracked objects included in the image information except for the main objects. Alternatively, the object tracking module 140 may calculate an individual phase correlation only for the objects with an area having a size smaller than a predefined size in the image information. Such an application process may be applied according to a reference of determining the effectiveness of the object movement. That is, in the case that a selected specific object among the tracked objects has no effectiveness of the movement because the actual position of the selected specific object is different from the predicted position, the object tracking module 140 may calculate the phase correlation for all objects, or may calculate the phase correlation for some objects. At this time, the object tracking module 140 may consider the objects except for the above mentioned main object, or consider the objects having an area smaller than a predetermined size.

The object tracking module 140 may detect a descriptor, which is identical to at least one descriptor included in an object having a different movement direction in the previous image information, from the current image information. Further, the object tracking module 140 may track a movement position of the corresponding actual object by identifying a position of the matched descriptor. If a result of calculating the phase correlation in order to detect the movement of the object is deduced, the object tracking module 140 may correct the movements of the designated objects according to the result value in operation 313. After performing the correction of the movement, the object tracking module 140 may support an application of an augmented reality content to one or more objects in which at least one of the movement position, the movement angle, and the movement direction is corrected.

On the other hand, in operation 307 of identifying the effectiveness of the movement, the object tracking module 140 does not determine the effectiveness of the movement for each of all objects, but identifies the effectiveness of the movements of the predetermined objects. For example, the object tracking module 140 can identify the effectiveness of the movements only for objects having an area smaller than a predetermined size.

FIG. 5 illustrates a state that the image information 40 includes the first object Obj1 41, the second object Obj2 42, and the background object 43. The first object 41 and the second object 42 among these may move in a direction different from the movement direction of other objects. Here, the background object 43 functions as a main object when the movement direction of the image information 40 is predicted. The first and second objects 41 and 42 having a relatively small area in comparison with the background object 43 may be objects for the determination of the effectiveness of the movement.

Although the movement reliability of the objects 41, 42, and 43 of FIG. 5 is deduced by the background object 43 to be higher than a predetermined reference value, the object tracking module 140 may identify that each object 41, 42, or 43 is not located at a predicted position of the objects 41, 42, and 43 in the process of identifying the effectiveness of the movement. That is, the object tracking module 140 may identify that an object is horizontally moved according to the background object 43. The object tracking module 140 may guess the predicted position for other objects, e.g., first object 41 and second object 42, by a reference of a horizontal movement direction and a movement distance of the background object 43. Further, the object tracking module 140 may identify whether the features corresponding to the first object 41 and the second object 42 are detected at a predicted position.

Here, it is assumed that the first object 41 and the second object 42 move in a substantially different direction from that of the background object 43. Further, the object tracking module 140 does not detect the features of the first object 41 and the second object 42 at expected positions. In this case, the object tracking module 140 determines therefore that the movement of the object is ineffective. Then, the object tracking module 140 may detect an actual movement position of the first object 41 and the second object 42 by calculating the phase correlation for the previous image information and the current image information. Here, the object tracking module 140 may not calculate the phase correlation for the background object 43. However, the object tracking module 140 may calculate the phase correlation only for the area of the first object 41 and the area of the second object 42 in the previous image information.

Referring to FIGS. 3 and 6 in order to describe the third embodiment, e.g., "C", of the present disclosure, if the movement reliability is less than a reference value in operation 305, the object tracking module 140 may perform operation 315 to calculate the phase correlation of the objects. A case that the movement reliability is less than the reference value corresponds to a case that a variance of the phase correlation of the objects included in the image information is not less than the predetermined value. That is, it may be a case that the movement reliability of the objects included in the image information is small or none. In this case, the object tracking module 140 may calculate the phase correlation for each object included in the image information. If the calculation of the phase correlation for each object is completed, the object tracking module 140 may detect an actual movement position of each object based on a calculation result. The object tracking module 140 may support the application of the augmented reality contents to each object when applying the movement of the objects.

FIG. 6 illustrates circumstances of the third embodiment in which the movement reliability of the objects 41 and 42 is smaller than a reference value. More particularly, the image information 40 shown in FIG. 6 may be a situation that the first object Obj1 41 and the second object Obj2 42 are arranged as important objects in the state that the background object is hardly arranged. Since the first object 41 and the second object 42 are arranged throughout substantially a whole area of such image information 40 as shown in the drawings, the first object 41 and the second object 42 may be the main objects of the corresponding image information 40. Accordingly, in the image information 40, as shown in the drawings, the movement reliability may be detected to be remarkably low because the first object 41 and the second object 42 move in different directions. Therefore, the object tracking module 140 of the present disclosure may determine that the movement reliability of the main objects is lower than the reference value. The object tracking module 140 may calculate the phase correlation for each object 41 or 42 so as to detect the actual moved position of each object 41 or 42.

In the above description, a process of calculating the phase correlation after the movement reliability is compared with the reference value and the effectiveness of the movement of the object is estimated according to the comparison result, or calculating the phase correlation without the estimation of the movement of the object has been described. Here, in another embodiment of the present disclosure, it is possible to design the movement reliability so as to support a comparison of plural reference values for the movement reliability.

More particularly, the object tracking module 140 may apply a movement of an object without an estimation of the effectiveness in the movement of the object if the movement reliability is not less than a first reference value which is predefined. For example, as shown in FIG. 4, the relatively highest movement reliability may be detected if all the objects, e.g., the background object 43, the first object 41 and the second object 42, move at the same distance in an identical direction. In this case, separate estimation of the effectiveness in the movement of the object may be omitted.

As shown in FIG. 5, further, in the case that the objects, e.g., the background object 43, the first object 41 and the second object 42, included in the image information 40 move in different directions, the estimation of the effectiveness in the movement of the object needs to be performed although the relatively highest movement reliability is detected. Accordingly, if a value of the movement reliability is not less than a first reference value which is predefined, the object tracking module 140 may give support to omit estimation of effectiveness in the movement of the object when applying the movement of the object.

Further, if the value of the movement reliability is not more than the first reference value and not less than a second reference value, the object tracking module 140 may give support to perform estimation of the effectiveness in the movement of at least one object when applying the movement of the object. Alternatively, if the value of the movement reliability is not more than the first reference value and not less than the second reference value, the object tracking module 140 may give support to perform estimation of the effectiveness in the movement of the objects. In addition, the object tracking module 140 may give support to perform the phase correlation of the objects without the effectiveness in the movement of the object. Here, the object tracking module 140 may control to perform the phase correlation for the objects in which a main object is excluded, or for the objects with an area smaller than a predetermined size. On the other hand, if the value of the movement reliability is not more than the second reference value, the object tracking module 140 may perform a process according to the third embodiment of the present disclosure.

Figure 7:
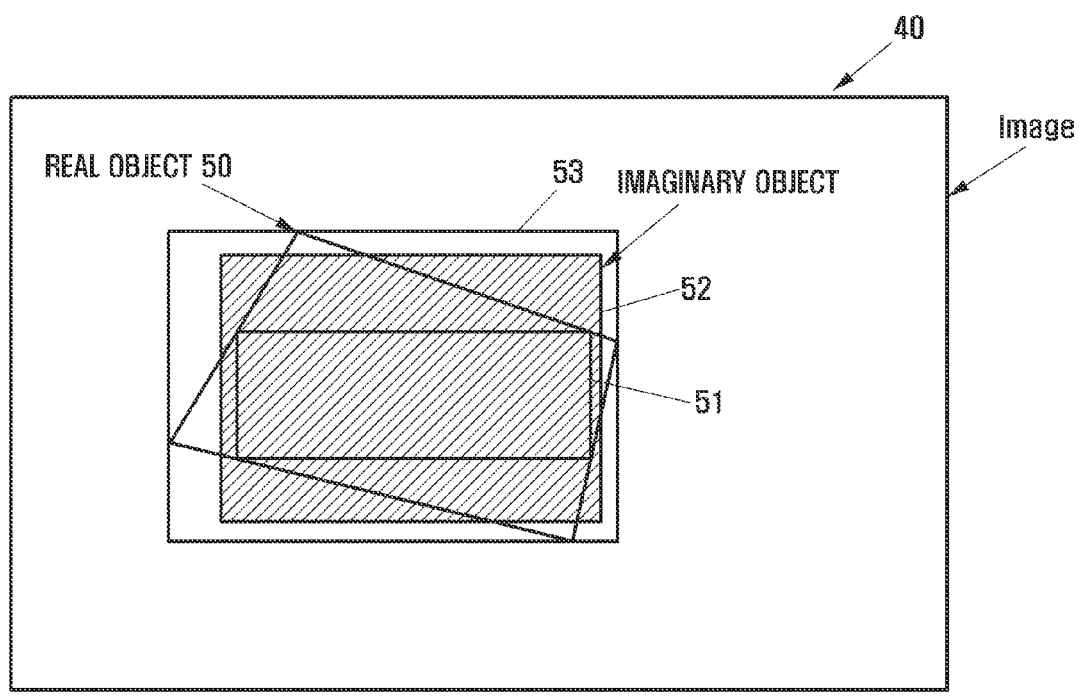
FIG. 7 is a view illustrating an applied approximation function during a performance of the object tracking function according to an embodiment of the present disclosure.

The object tracking module 140 may apply an object area approximation scheme as shown in FIG. 7, when the phase correlation is performed in a process of detecting the movement of the objects in FIGS. 3 to 6.

FIG. 7 is a view illustrating an object area approximation function in the performance of the object angle prediction function of the present disclosure according to an embodiment of the present disclosure.

Referring to FIG. 7, in the case that an object area of an actual object 50 obtained in the image information 40 does not appear with a side parallel with an outline of the image information 40, the object tracking module 140 may form an object area of imaginary objects 51, 52, and 53 through the object area approximation, and may map the actual object 50 with at least one of the imaginary objects 51, 52, and 53. At this time, the imaginary objects 51, 52, and 53 may be arranged at an area adjacent to a position at which the actual object 50 is arranged. Although position detection for the actual object 50 is performed by a reference of at least one of the imaginary objects 51, 52, and 53 corresponding to the actual object 50, the object tracking module 140 may support a suitable object angle prediction function.

For motion estimation of separate objects, the object area on the previous image is approximated with a rectangle, and this rectangle may represent smaller images obtained from the previous and current images. The phase correlation method is applied to these cropped images to calculate object motion in the same way as for full images. For better accuracy, crop rectangle size is chosen to include most or all of object area and to be suitable for Fourier Transform.

The imaginary objects 51, 52, and 53 may have an appearance with a side parallel with the outline of the image information 40, for example, rectangular shape. The object tracking module 140 may perform a scanning in a horizontal direction or a vertical direction when scanning data included in the image information 40. When one or more imaginary objects 51, 52, and 53 prepared in parallel with the outline of the image information 40 are mapped with the actual object 50, the object tracking module 140 may perform the position detection of the imaginary object more rapidly than in the position detection for the actual object 50 and may reduce an amount of calculations in detection.

On the other hand, a previous position of the actual object 50 in the image information may be calculated through the recognition module 120 and the localization module 130. The object tracking module 140 may perform a mapping operation of the imaginary objects 51, 52, and 53 with the corresponding actual object 50 by a reference of a position value in the previous image information. Further, the object tracking module 140 may perform the mapping operation of the imaginary objects 51, 52, and 53 with the actual object 50 with respect to a predicted movement position. That is, the object tracking module 140 may perform a prediction calculation (position detection) by applying the above-mentioned imaginary objects 51, 52, and 53 in the position detection of the actual object 50 in the current image information.

On the other hand, in FIG. 7, three imaginary objects 51, 52, and 53 are illustrated as an example. The imaginary objects 51, 52, and 53 may be constituted to have a predetermined size by a reference of each actual object 50. For example, the first imaginary object 51 may be configured to have a square shape with a maximum size, which is disposed in an object area of the actual object 50, through the object area approximation. At this time, the square shape may be parallel with the outline of the image information 40. The third imaginary object 53 may be configured to have a square shape with a maximum size, which includes an apex which the actual object 50 has, through the object area approximation. The second imaginary object 52 is a square shape drawn by a reference of an intermediate value between the first imaginary object 51 and the second imaginary object 52 through the object area approximation.

If the position detection of the actual object 50 is performed by detecting a descriptor based on the first imaginary object 51 including points of the actual object 50, the position detection may be relatively accurate in comparison with other imaginary objects 52 and 53. However, since a compared area is relatively small in the second imaginary object 52, but relatively wider areas must be compared in the image information 40, an amount of calculations may be increased. On the other hand, in the case that the position detection is performed based on the third imaginary object 53, even a descriptor without relation to the actual object 50 may be included in a compared object and a relatively significant error for the position detection may occur. Since the descriptor is compared with the object in a relatively wide area, however, a rapid calculation is possible when the descriptor is compared with the currently collected image information 40. The second imaginary object 52 may provide an effect corresponding to an intermediate effect between an effect of the first imaginary object 51 and an effect of the third imaginary object 53. A process of operating at least one of the above-mentioned imaginary objects 51, 52, and 53 may be changed by a selection of a designer.

In the above description, on the other hand, although the object area approximation has been described by a reference of diagram with four sides and four angles between the sides, the present disclosure is not limited thereto. That is, with respect to an object having a different number of sides and angles than the number of those of the diagram mentioned above, the approximation to a diagram which the object tracking module 140 easily recognizes may be achieved. For example, imaginary objects 51, 52, and 53 having a square shape may be created for a triangular diagram or an octagonal diagram according to the process of creating the above-mentioned imaginary objects 51, 52, and 53.

Figure 8:
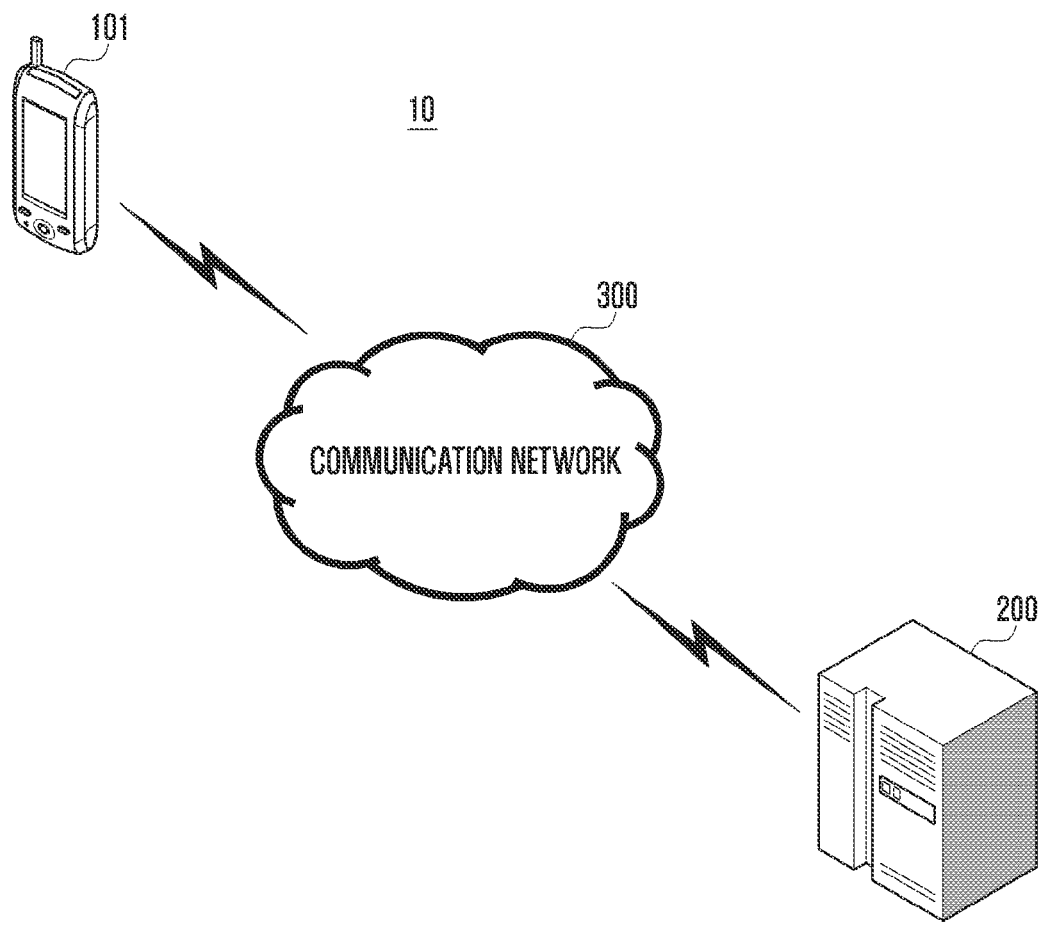
FIG. 8 is a view schematically illustrating a configuration of a system supporting the object tracking function of the present disclosure according to an embodiment of the present disclosure.

FIG. 8 is a view schematically illustrating a configuration of a server based system for supporting an object tracking function according to an embodiment of the present disclosure.

Referring to FIG. 8, an object processing system 10 of the present disclosure may include an electronic device, e.g., a user terminal 101, a server system 200 and a communication network 300.

In the object processing system 10 of the present disclosure including the above-mentioned configuration, the object tracking module 140 supporting an object tracking function is equipped to the user terminal 101, so as to support the object tracking function. At this time, the object processing system 10 of the present disclosure gives support of forming a communication channel between the server system 200 and the user terminal 101 through the communication network 300 by using a communication module of the user terminal 101. Accordingly, the object processing system 10 may receive different information through the server system 200 in the process of supporting the object tracking function. Alternatively, in the object processing system 10 of the present disclosure, the user terminal 101 may receive and store data from the server system 200, and support the object tracking function based on the stored data.

The user terminal 101 may access the server system 200 through the communication network 300. Further, the user terminal 101 may provide obtained image information to the server system 200. Particularly, the user terminal 101 may provide obtained image information to the server system 200 in real time. Then, the server system 200 may perform the phase correlation for the object tracking based on the received image information, and provide a result value to the user terminal 101. The user terminal 101 may omit calculation for the object tracking in the image information, and give support of processing data for the object tracking based on values provided by the server system 200. On the other hand, the user terminal 101 may receive remote reference data and content data which are provided by the server system 200. Further, the user terminal 101 may perform recognition and localization of the image information by using the remote reference data. In addition, the user terminal 101 may control to apply the content data to the augmented reality service.

The communication network 300 may be interposed between the user terminal 101 and the server system 200. Further, the communication network 300 may establish a communication channel between two configurations, e.g., the user terminal 101 and the server system 200. The communication network 300 may be constituted of a mobile communication network system if the user terminal 101 supports a mobile communication function. Furthermore, the communication network 300 may be constituted of a system supporting a corresponding Internet network if the server system 200 connects communication devices through the Internet network. In addition, the communication network 300 further includes a network system for transmitting data between heterogeneous networks. Accordingly, it should be understood that the communication network 300 of the present disclosure is not limited to a specific communication scheme, a specific communication module, or the like, but as a system to which various devices and methods for performing data communication between the user terminal 101 and the server system 200 are applied.

The server system 200 may support an access of the user terminal 101. In addition, the server device 200 may support the object tracking function and the augmented reality service function according to a request of the user terminal 101. To do this, the server system 200 may store the remote reference data to support the object tracking function. Further, the server system 200 may store the content data applied to the augmented reality in order to support the augmented reality service function. The server system 200 may perform at least one of a recognition process, a localization process, and an object tracking process of specific image information according to the request of the user terminal 101. Furthermore, the server system 200 may provide a result of each process according to a request of the user terminal 101.

Figure 9:
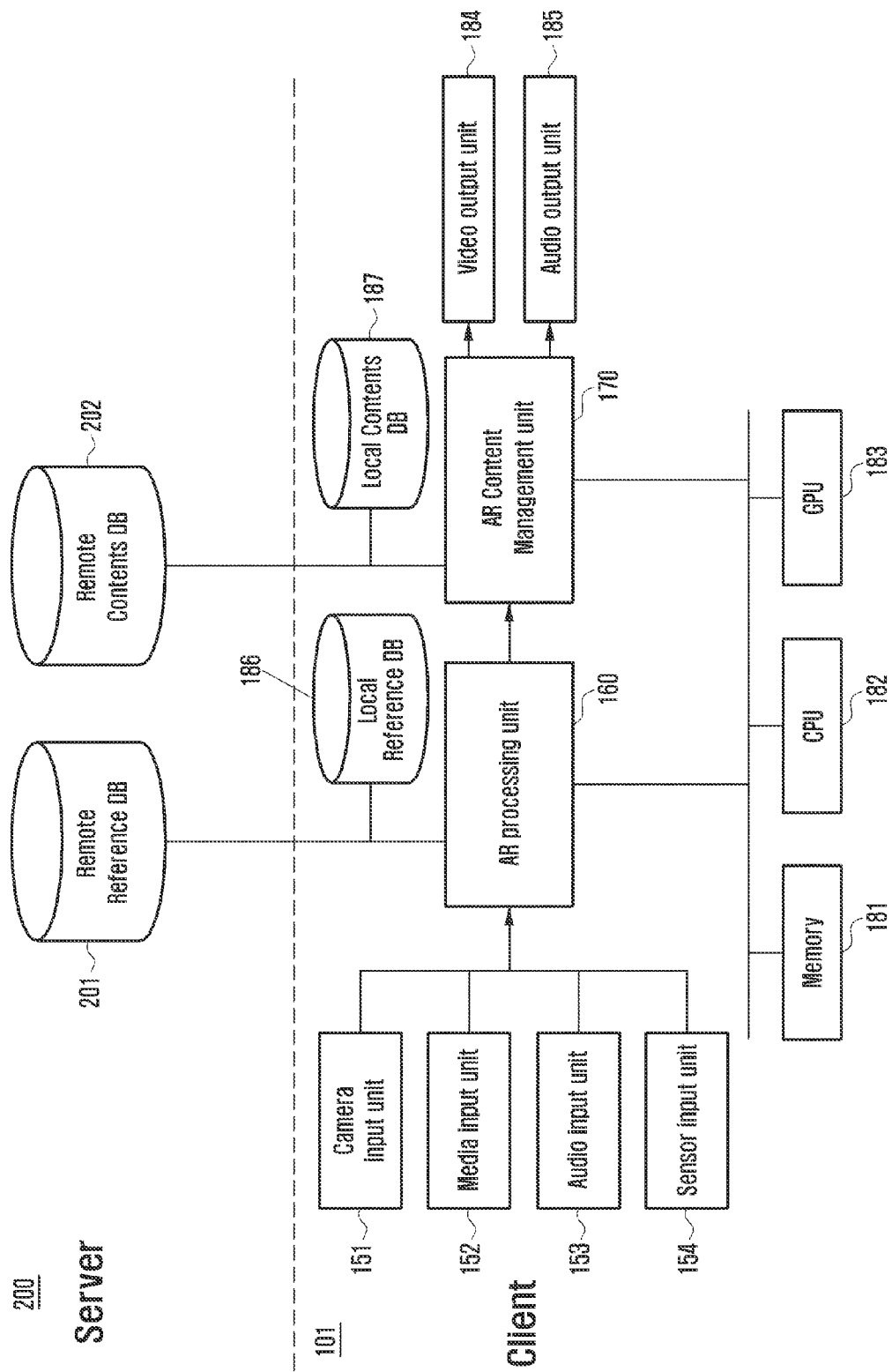
FIG. 9 is a block diagram illustrating the configuration of the system of FIG. 8 according to an embodiment of the present disclosure.

FIG. 9 is a block diagram particularly illustrating an example of the configurations of the user terminal 101 and the server system 200 in the configurations of FIG. 8 according to an embodiment of the present disclosure.

Referring to FIG. 9, the block diagram shows the configuration of the object processing system 10 supporting the augmented reality service according to the above mentioned embodiment. The object processing system 10 may include a main unit 160, e.g., an augmented reality processing unit.

The main unit 160 may receive various input data from different input devices such as a camera input unit 151, a media input unit 152, an audio input unit 153, and at least one sensor input unit 154. The sensor input unit 154 may include an acceleration sensor, a gyroscope sensor, a magnetic sensor, a temperature sensor, a gravity sensor, and the like, and detect various inputs from different sensors. The main unit 160 may use a memory 181, a CPU 182, a GPU 183, and the like in order to process input data. The main unit 160 may use remote reference database 201 provided by the server system 200 or a local reference database 186 in order to identify and recognize targets. The output of the main unit 160 may include identification information and localization information. The localization information may be used to identify a two dimensional (2D)/three dimensional (3D) angle of a target object. The identification information may be used to identify what a target is.

An augmented reality content management unit 170 may be used to combine contents from a remote content database 202 prepared for the server system 200 or a local content database 187, and the output of the main unit 160 while finally outputting them through a video output unit 184 and an audio output unit 185.

The object processing system 100 described above may be mounted on the main unit 160 in the above-mentioned configuration of the user terminal 101. Further, the object processing system 100 may be mounted on the user terminal 101 with the configurations of the main unit 160 and the AR content management unit 170 included therein.

Figure 10:
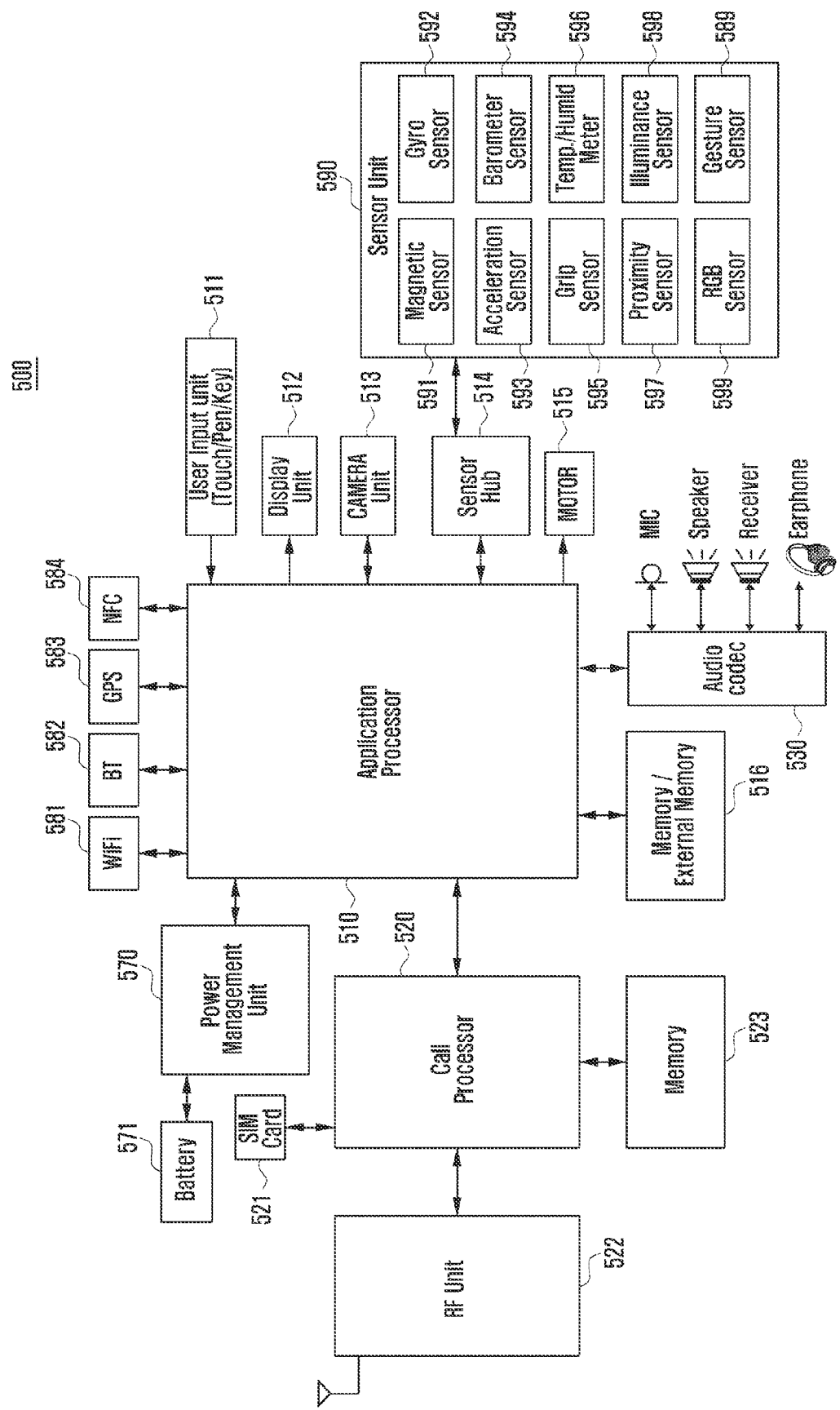
FIG. 10 is a block diagram schematically illustrating an example of a configuration of an electronic device to which the object processing device according to the present disclosure is applicable according to an embodiment of the present disclosure.

FIG. 10 is a view illustrating the configuration of an electronic device to which the object tracking function of the present disclosure is applied according to an embodiment of the present disclosure. That is, the electronic device 500 illustrated in FIG. 10 may be an example of the electronic device on which the above mentioned object tracking module 140 is mounted.

Referring to FIG. 10, the electronic device 500 may include an application processor 510 and a call processor 520. The call processor 520 may perform a transmission/reception of a signal to/from a Radio Frequency (RF) unit 522, a memory 523 and a Subscriber Identity Module (SIM) card 521. In addition, the call processor 520 may communicate with the application processor 510, so as to support a function necessary for accessing the RF unit 522, the memory 523 and the SIM card 521 among the functions processed by the application processor 510. The above-mentioned object processing system 100 may be mounted on any one of the application processor 510 and the call processor 520 in the configuration of the electronic device 500. Alternatively, the object processing system 100 may be provided as a separate and independent hardware device instead of being mounted on the above mentioned configurations of the electronic device 500, and disposed in a predetermined area of the electronic device 500.

The application processor 510 is supplied with electric power from a power management unit 570 to which a power source such as a battery 571 is connected. The application processor 510 may perform a transmission and reception of a signal to/from various communication modules as well as the RF unit 522, e.g., a WiFi module 581, a BLUETOOTH module 582, a Global Positioning System (GPS) module 583, a Near Field Communications (NFC) module 584, and the like, and support functions performed by each module 581, 582, 583, or 584. The application processor 510 may be connected to a user input unit 511 including a touch input, a pen input, a key input, and the like. The application processor 510 may be connected with a display unit 512, a camera unit 513, a motor 515, an audio processor including a coder-decoder (codec) 530, a memory/external memory 516, and the like. The audio processor 530 may include a microphone, a speaker, a receiver, an earphone connection jack, and the like. The application processor 510 may be connected with a sensor hub 514. The sensor hub 514 may be connected with a sensor unit 590 including various sensors. The sensor unit 590 may include at least one of a magnetic sensor 591, a gyro sensor 592, an acceleration sensor 593, a barometer 594, a grip sensor 595, a temperature and humidity sensor (thermometer/hygrometer) 596, a proximity sensor 597, an illuminance sensor 598, a Red Green Blue (RGB) sensor 599, and a gesture sensor 589.

Figure 11:
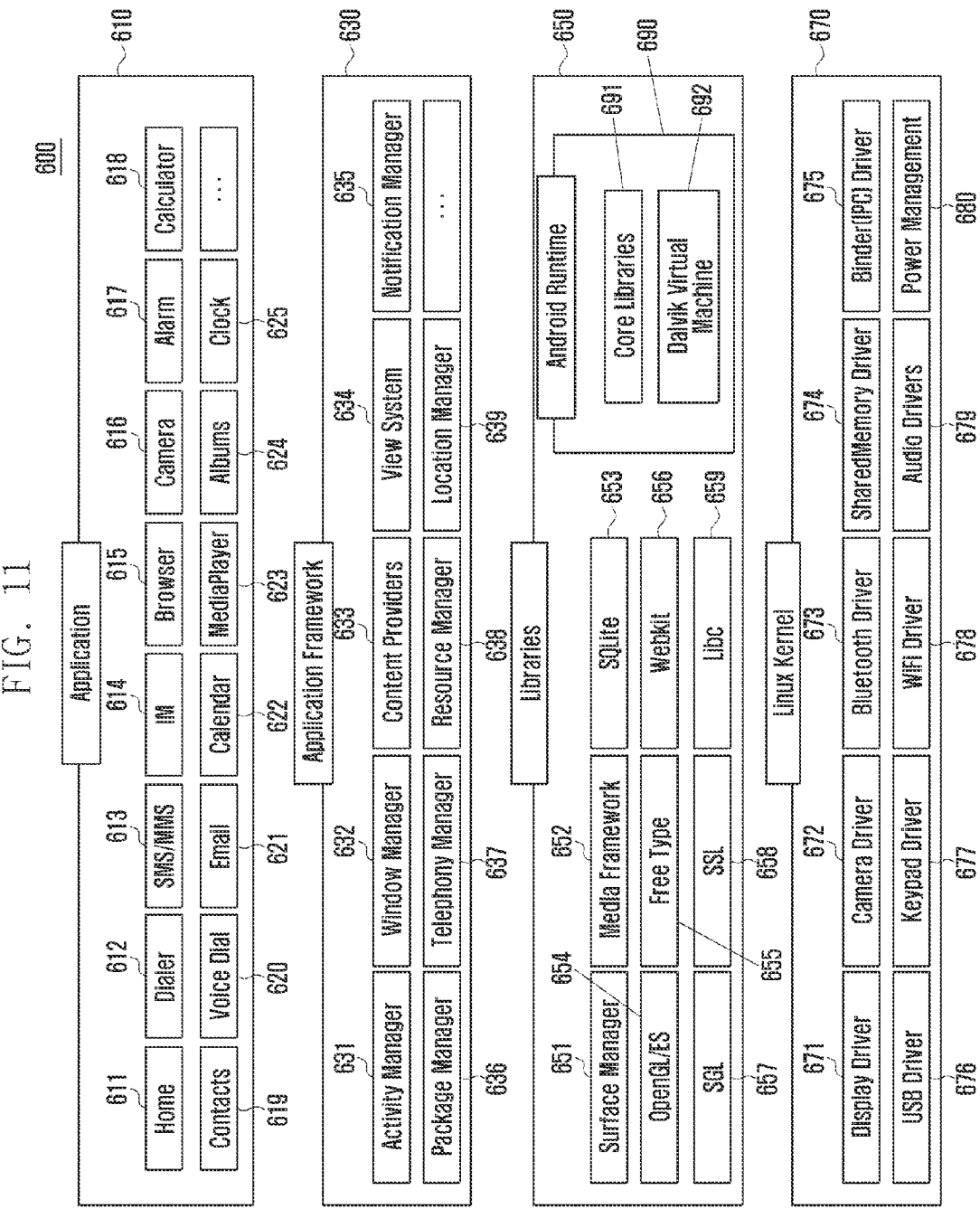
FIG. 11 is a view illustrating a configuration of a platform to which the object processing device according to the present disclosure is applicable according to an embodiment of the present disclosure.

FIG. 11 is a view illustrating a platform to which the object tracking function of the present disclosure is applied according to an embodiment of the present disclosure.

Referring to FIG. 11, the platform 600 to which the object tracking function of the present disclosure is applied may include an application layer 610, an application framework layer 630, a library layer 650, and a kernel layer 670.

The kernel layer 670 may be formed of a Linux kernel as an example. The kernel layer 670 is a core of an operating system, and may perform at least one of a hardware driver operation in an electronic device, security of hardware and processor in the electronic device, an efficient management of a system resource, a memory management, a providing of an interface for hardware through hardware abstraction, a multi process, service access management, and the like. The kernel layer 670 may have a display driver 671, a camera driver 672, a BLUETOOTH driver 673, a shared memory driver 674, a binder (Inter Process Communication (IPC)) driver 675, a Universal Serial Bus (USB) driver 676, a keypad driver 677, a WiFi driver 678, an audio driver 679, and a power management 680 arranged therein. The kernel layer 670 may be configured to support an operation according to the present disclosure of tracking and processing one or more objects included in the image by means of the above mentioned driver, additional drivers, e.g., various sensor drivers, or utility.

The library layer 650 may be interposed between the kernel layer 670 and the application layer 610, and may function as a medium between the kernel layer 670 and the application layer 610 so as to transmit and receive data to/from other hardware or software. Accordingly, it is possible to provide a standard interface, to support different environments, and to make mutual association with a task of another system. The library layer 650 may include a surface manager 651, a media framework 652, SQLite 653, OpenGL/ES 654, Freetype 655, Webkit 656, a Scalable Graphics Library (SGL) 657, a Secure Sockets Layer (SSL) 658, Libc 659, and the like. The library layer 650 may be configured to support an operation of tracking and processing one or more objects included in the image according to the present disclosure. For example, the library layer 650 may manage a state in which various applications to be executed, e.g., an AR application, is displayed on a screen, and may support the 2D/3D graphic based display of obtained image information.

The library layer 650 may include an Android runtime 690. The Android runtime 690 may be present on the kernel layer 670, and may support efficient use of the memory, a data structure to share data between processors, and the like. The Android runtime 690 may provide essential functions such as container, utility, input/output, and the like. The Android runtime 690 may include core libraries 691 and Dalvik Virtual Machine 692. The Dalvik Virtual Machine 692 may support a widget function of the electronic device in which the object tracking function is supported, a function required to be executed in real time, a function required to be periodically executed according to a preset scheduling, and the like.

The application framework layer 630 indicates an Application Program Interface (API) of the operating system, and may include a program which is a foundation of applications in the application layer 610. The application framework layer 630 may be compatible with any application, in which reuse, movement, or exchange of component is possible. The application framework layer 630 may include a supporting program, a program for connecting other software structural elements, and the like. The application framework layer 630 may have an activity manager 631, a window manager 632, content providers 633, a view system 634, a notification manager 635, a package manager 636, a telephony manager 637, a resource manager 638, a location manager 639, and the like arranged therein.

The application framework layer 630 may be configured to support an operation of tracking and processing one or more objects included in the image by means of the above-mentioned manager or an additional manager according to the present disclosure. For example, the application framework layer 630 may support a smooth navigation of applications executed by another processor through the activity manager 631, and may identify which applications are installed in the electronic device or which function each application performs through the package manager 636. The application framework layer 630 may further include one or more managers corresponding to the object tracking module 140 in the present disclosure, and may be configured to support an obtainment of an image in the AR application, a detection of movement of one or more objects in the obtained image, a determination of movement reliability according to the movement of the objects, a determination of effectiveness in the movement of the objects, a processing of the movement of the objects, and the like through the corresponding managers. For example, the application framework layer 630 may determine phase correlation values between the objects from the obtained image, and may support an operation of calculating variance of the phase correlation values by using a peak value.

The application layer 610 may include various programs which are executed and displayed in the electronic device. For example, the application layer 610 may include a User Interface (UI) application related to various menus and the like in the electronic device, applications which are downloaded and stored through an external device or a network and which are freely installed or uninstalled by the user, and the like. Through such an application layer 610, the augmented reality service, an Internet phone service by accessing the network, a Video On Demand (VOD) service, a Web album service, a Social Network Service (SNS), a Location Based Service (LBS), a map service, a Web search service, an application search service, a Short Message Service (SMS)/a Multimedia Message Service (MMS), a mail service, an address service, a media reproduction service, and the like may be performed. Further, the application layer 610 may perform various functions such as a game, schedule management, and the like. For example, the application layer 610 may have a home application 611, a dialer application 612, an SMS/MMS application 613, an IM application 614, a browser application 615, a camera application 616, an alarm application 617, a calculator application 618, a contacts application 619, a voice dial application 620, an E-mail application 621, a calendar application 622, a media player application 623, an albums application 624, a clock application 625, and the like arranged therein.

The platform described above may be generally used in various devices as well as the electronic device according to the present disclosure. Further, the platform according to the present disclosure may be stored or loaded in at least one of the memory and the processor, or a separate processor as described above.

An operation, e.g., an operation of tracking and processing the object in the image obtained in an AR service performance, according to the present disclosure will be described with reference to FIGS. 10 and 11.

For example, in the present disclosure, image data through the camera unit 513, voice data through the microphone, and various data collected from the sensor unit 590, the GPS 583 and the like through the sensor hub 514 may be used as an input. Various input data may be processed by calculation designated by the processor 510. Further, the present disclosure may support various types of communication using the WiFi module 581, the BLUETOOTH module 582, and the NFC module 584 in preparation for the case that the electronic device shares data or external data with the server system 200 or with another electric device. Further, in the present data, data necessary for calculation may be used in the main memory 523 or the external memory 516, and a result deduced through the calculation can be provided to the user again through a module such as a display unit 512, a speaker, or the like.

With such an operation described in view of software of the operating system, e.g., Android, of the electronic device, various drivers, e.g., the camera driver 672, the audio driver 679, the sensor driver and the like, of the kernel layer 670 which is disposed at the lowest end may perform an operation of receiving input data. For example, the electronic device may perform the operation of receiving the input data, e.g., image, from the camera unit 513 through the camera driver 672 to support the AR service.

Further, the electronic device may use various modules, e.g., a surface manager 651, a media framework 652, an SQLite 653, OpenGL/ES 654, Webkit 656, Libc 659 and the like, which are provided by the library layer 650 in order to drive designated calculation based on the input data. For example, the library layer 650 may use the Libc 659 in order to basically process most of calculation, and the media framework 652 in order to manage the media data such as input image/voice. According to an embodiment, the electronic device may perform calculation, for example, the object area approximation through the Libc 659, with relation to tracking and processing the object in the image obtained when the AR service is performed. Furthermore, the electronic device may support media, e.g., image, of the AR service through various codecs, e.g., Advanced Video Coding (AVC) (H.264), H.263, Motion Picture Experts Group (MPEG)-2 Audio Layer III (MP3), MPEG-4 and the like, which the media framework 652 includes.

Further, the electronic device may use various functions provided by the library layer 650 in order to efficiently express a calculation result. For example, the electronic device may use the OpenGL/ES 654, the surface manager 651 and the like in order to provide a three-dimensional graphic effect. According to an embodiment, the electronic device may support the three-dimensional graphic according to the AR service by means of OpenGL/ES 654, and may also support a hardware acceleration function. Accordingly, the electronic device may mix and use the three-dimensional graphic and a two-dimensional graphic in the application, e.g., AR application. The electronic device may display a calculation result processed in the library layer 650 on the display unit 512 through the display driver 671 of the kernel layer 670.

Further, the electronic device may use a database manager such as the SQLite 653 in order to manage the data. Furthermore, the electronic device may use the Webkit 656 in order to be associated with the Web, and may provide various applications, e.g., AR application, or various services, e.g., AR service, through the application framework layer 630 for a service of a superordinate level.

The above mentioned configurations do not limit a feature or a technical scope of the present disclosure, and merely illustrate examples to which the feature of the present disclosure is applicable. Some configurations of a system or a device shown in FIGS. 10 and 11 may be applicable in order to technically implement the present disclosure. Further, in view of those skilled in the art, the above mentioned configurations may be added to, omitted or modified in the embodiments of the present disclosure. Additionally, other configurations may be added according to a necessity of the embodiment of the present disclosure described above. One or more methods, steps, and algorithms disclosed in the present disclosure may be executed by using one or more configurations described in the abovementioned and implemented embodiments. For example, an image based AR platform may be implemented in the electronic device in order to give support of tracking and processing an object in an image according to the present disclosure.

On the other hand, the above-mentioned user terminal, electronic device, and the like may further include various and additional modules according to their provided type. That is, in the case that the user terminal, electronic device and the like are communication terminals, they may further include configurations such as a short-range communication module for short-range communication, an interface for a transmission and reception of data by a wired communication scheme or a wireless communication scheme of the user terminal and the electronic device, an Internet communication module for communication with the Internet network to perform the Internet function, a digital broadcasting module for receiving and reproducing digital broadcasting, and the like, which are not described above. Such structural elements may have various modifications which are not listed, according to a convergence trend of a digital device. However, a structural element having a level equal to the above-mentioned structural elements may be further included. Further, in the user terminal, the electronic device and the like of the present disclosure, specific structural elements may be removed from the above-mentioned configuration or substituted with other structural elements according to their provided type. This will be understood by those skilled in the art.

Further, the user terminal, the electronic device and the like according to the embodiment of the present disclosure may include, for example, all information and communication devices, multimedia devices and the application devices thereof, such as a Portable Multimedia Player (PMP), a digital broadcasting player, a Personal Digital Assistant (PDA), a music reproduction device, e.g., an MP3 player, a portable gaming terminal, a smart phone, a laptop computer, a notebook Personal Computer (PC), a slate PC, a tap-book computer, a hand-held PC and the like, as well as all mobile communication terminals which are operated based on communication protocols corresponding to various communication systems.

While the present disclosure has been shown and described with reference to various embodiments thereof, it will be understood by those skilled in the art that various changes in form and details may be made therein without departing from spirit and scope of the present disclosure as defined by the appended claims and their equivalents.

What is claimed is:

1. A method of operating an electronic device, the method comprising:
   tracking at least one object included in a plurality of digital images including at least a first image and a second image,
   wherein the tracking of the object comprises:
      determining values of phase correlation between a part of the first image associated with the at least one object and a part of the second image associated with the at least one object,
      determining a position of a peak value among the values of the phase correlation,
      determining a variance of the values of the phase correlation according to at least a part of the peak value, and
      determining a movement reliability value of the at least one object based on the determined variance of the values of the phase correlation.

2. The method as claimed in claim 1, wherein the tracking of the at least one object is performed differently based on the determined variance of the values of the phase correlation.

3. The method as claimed in claim 2,
   wherein the tracking of the at least one object is performed using a first processor if the variance is less than a selected value, and
   wherein tracking the at least one object is performed using a second processor if the variance is greater than or equal to the selected value.

4. The method as claimed in claim 3, further comprising:
   determining, by the first processor, whether the at least one object located at a first position in the first image moves to a second position in the second image,
   wherein the second position is determined based on the position of the peak value.

5. The method as claimed in claim 4, further comprising:
   determining a pixel correlation between an area of the at least one object at the first position in the first image and an area of the at least one object at the second position in the second image by using the first processor.

6. The method as claimed in claim 5, wherein if the pixel correlation is greater than or equal to the selected value, the first processor determines that the at least one object moves from the first position to the second position.

7. The method as claimed in claim 4, further comprising:
   disregarding the position of the peak value if it is determined that the at least one object does not move from the first position to the second position.

8. The method as claimed in claim 7, wherein the disregarding of the position of the peak value comprises:
   performing the phase correlation for each object associated with the first and second images.

9. The method as claimed in claim 3, wherein the second processor performs the tracking of the at least one object without regard to the position of the peak value.

10. The method as claimed in claim 9, wherein the tracking of the at least one object without regard to the position of the peak value comprises: performing the phase correlation for each object associated with the first and second images.

11. The method as claimed in claim 8, wherein the performing of the phase correlation for each object further comprises:
   approximating the at least one object in a selected form.

12. An electronic device comprising:
   a memory configured to store a plurality of digital images, wherein the plurality of digital images includes a first image and a second image; and
   a processor configured to:
      determine values of phase correlation between a part of the first image associated with the at least one object and a part of the second image associated with the at least one object,
      determine a position of a peak value among the values of the phase correlation,
      determine a variance of the values of the phase correlation according to at least a part of the peak value, and
      determine a movement reliability value of the at least one object based on the determined variance of the values of the phase correlation.

13. The electronic device as claimed in claim 12, wherein the processor is further configured to perform the tracking of the at least one object differently based on the determined variance of the values of the phase correlation.

14. The electronic device as claimed in claim 12, wherein the processor comprises:
   a first processor configured to track the at least one object if the variance is less than a selected value; and
   a second processor configured to track the at least one object if the variance is greater than or equal to the selected value.

15. The electronic device as claimed in claim 14,
   wherein the first processor determines whether the at least one object located at a first position in the first image moves to a second position in the second image, and
   wherein the second position is determined based on the position of the peak value.

16. The electronic device as claimed in claim 15, wherein the first processor determines a pixel correlation between an area of the at least one object at the first position in the first image and an area of the at least one object at the second position in the second image.

17. The electronic device as claimed in claim 16, wherein if the pixel correlation is greater than or equal to the selected value, the first processor determines that the at least one object moves from the first position to the second position.

18. The electronic device as claimed in claim 15, wherein the first processor disregards the position of the peak value if it is determined that the at least one object does not move from the first position to the second position.

19. The electronic device as claimed in claim 18, wherein the first processor performs a phase correlation for each object associated with the first and second images.

20. The electronic device as claimed in claim 14, wherein the second processor disregards the position of the peak value.

21. The electronic device as claimed in claim 20, wherein the second processor performs a phase correlation for each object associated with the first and second images.

22. The electronic device as claimed in claim 19, wherein at least one of the first processor and the second processor approximates the at least one object in a selected form.

* * * * *